US012633481B2

(12) United States Patent
Otsuka

(10) Patent No.: US 12,633,481 B2
(45) Date of Patent: May 19, 2026

(54) ELECTROMAGNETIC RELAY

(71) Applicant: OMRON Corporation, Kyoto (JP)

(72) Inventor: Kohei Otsuka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 247 days.

(21) Appl. No.: 18/716,143

(22) PCT Filed: Nov. 16, 2022

(86) PCT No.: PCT/JP2022/042465

§ 371 (c)(1),
(2) Date: Jun. 4, 2024

(87) PCT Pub. No.: WO2023/119957

PCT Pub. Date: Jun. 29, 2023

(65) Prior Publication Data

US 2025/0029804 A1 Jan. 23, 2025

(30) Foreign Application Priority Data

Dec. 22, 2021 (JP) ................................ 2021-207958

(51) Int. Cl.
*H01H 50/42* (2006.01)
*H01H 50/44* (2006.01)
*H01H 50/54* (2006.01)

(52) U.S. Cl.
CPC .......... *H01H 50/42* (2013.01); *H01H 50/546* (2013.01); *H01H 50/44* (2013.01)

(58) Field of Classification Search
CPC ...... H01H 50/42; H01H 50/546; H01H 50/44; H01H 50/045; H01H 50/16; H01H 50/18; H01H 50/36; H01F 7/16
See application file for complete search history.

(56) References Cited

U.S. PATENT DOCUMENTS 5,959,519 A 9/1999 Goebel et al.
2015/0048908 A1* 2/2015 Isozaki .................... H01H 1/54 335/6

(Continued)

FOREIGN PATENT DOCUMENTS

CN 203839295 U * 9/2014 ............. H01H 50/58
JP H05-23382 U 3/1993

(Continued)

OTHER PUBLICATIONS

The International Search Report of International Application No. PCT/JP2022/042465 issued on Jan. 17, 2023.

(Continued)

*Primary Examiner* — Mohamad A Musleh
(74) *Attorney, Agent, or Firm* — SHINJYU GLOBAL IP

(57) ABSTRACT

An electromagnetic relay includes a first fixed terminal, a second fixed terminal, a movable contact piece, a moving member, a drive device, and a magnet member. The first fixed terminal includes a first fixed contact. The second fixed terminal includes a second fixed contact. The movable contact piece includes a first movable contact facing the first fixed contact in a first direction and a second movable contact facing the second fixed contact in the first direction, the first direction including a contact direction toward the first fixed contact and a separation direction away from the first fixed contact. The moving member is connected to the movable contact piece. The drive device includes a coil, a movable iron core, and a first yoke. The coil generates electromagnetic force. The movable iron core is arranged radially outside of the coil and is fixed to the moving member. The first yoke includes an attracting portion to attract the movable iron core by the electromagnetic force. The magnet member is arranged radially outside of the coil (Continued)

and assists the attracting portion to attract the movable iron core.

13 Claims, 9 Drawing Sheets

(56) References Cited

U.S. PATENT DOCUMENTS

| | | | |
|---|---|---|---|
| 2015/0380142 | A1 | 12/2015 | Cho et al. |
| 2017/0365431 | A1 | 12/2017 | Sakai et al. |
| 2020/0006025 | A1 | 1/2020 | Sakai et al. |

FOREIGN PATENT DOCUMENTS

| | | | | |
|---|---|---|---|---|
| JP | 2015-28979 | A | | 2/2015 |
| JP | 2015028979 | A | * | 2/2015 |
| JP | 2015-162537 | A | | 9/2015 |
| JP | 2017-228517 | A | | 12/2017 |
| WO | 2011/125142 | A1 | | 10/2011 |

OTHER PUBLICATIONS

The Written Opinion of the International Searching Authority of International Application No. PCT/JP2022/042465 issued on Jan. 17, 2023.

* cited by examiner

ELECTROMAGNETIC RELAY

CROSS-REFERENCE TO RELATED APPLICATION

This application is the U.S. National Phase of International Application No. PCT/JP2022/042465, filed on Nov. 16, 2022. That application claims priority to Japanese Patent Application No. 2021-207958, filed Dec. 22, 2021. The contents of those two applications are incorporated herein by reference in their entireties.

FIELD

The present invention relates to an electromagnetic relay.

BACKGROUND

Japanese Patent Application Publication No. 2017-228517 discloses an electromagnetic relay that includes an electromagnet device. The electromagnet device has a coil, a fixed iron core, a movable iron core, and a permanent magnet. The permanent magnet is located inside the coil and generates a magnetic flux between the fixed iron core and the movable iron core in the same direction as the magnetic flux generated by the coil. This configuration is intended to enhance the attraction of the fixed iron core to the movable iron core.

For efficient acquisition of the magnetomotive force of the coil, the inner diameter of the coil is preferably reduced. However, in the electromagnetic relay disclosed in the Japanese Patent Application Publication No. 2017-228517, a space is required for the magnet inside the coil, and therefore the inner diameter of the coil increases and the efficiency of the magnetomotive force of the coil decreases.

SUMMARY

A relay in accordance with the claimed invention exhibits less decrease in efficiency of the magnetomotive force of the coil in the electromagnetic relay.

The electromagnetic relay according to one aspect of the claimed invention includes a first fixed terminal, a second fixed terminal, a movable contact piece, a moving member, a drive device, and a magnet member. The first fixed terminal includes a first fixed contact. The second fixed terminal includes a second fixed contact. The movable contact piece includes a first movable contact that faces the first fixed contact in a first direction and a second movable contact that faces the second fixed contact in the first direction. The first direction includes a contact direction toward the first fixed contact and a separation direction away from the first fixed contact. The moving member is connected to the movable contact piece. The drive device is configured to move the moving member in the first direction. The drive device includes a coil, a movable iron core, and a first yoke. The coil generates electromagnetic force. The movable iron core is arranged radially outside of the coil with respect to the coil, and is fixed to the moving member. The first yoke includes an attracting portion to attract the movable iron core in the contact direction by the electromagnetic force. The attracting portion faces the movable iron core in the first direction. The magnet member includes at least one permanent magnet. The magnet member is arranged radially outside of the coil with respect to the coil, and assists the attracting portion to attract the movable iron core.

In the electromagnetic relay, a magnet member for assisting the attracting portion of the first yoke to attract the movable iron core is disposed radially outward of the coil with respect to the coil. With this configuration, an increase in the inner diameter of the coil from increasing can be prevented, compared to the case where the magnet member is arranged inside the coil. As a result, any reduction in the efficiency of the magnetomotive force of the coil can be decreased. Moreover, since the movable iron core is arranged radially outside of the coil, the degree of freedom in designing the movable iron core and the attracting portion is increased.

The magnet member may include a first magnet and a second magnet that faces the first magnet in a second direction orthogonal to the first direction. The movable iron core may be arranged between the first magnet and the second magnet. The first magnet and the second magnet may generate magnetic flux to the movable iron core in the same direction as the magnetic flux generated by the coil. In this case, the first magnet and the second magnet improve the attraction of the attracting portion to the movable iron core.

The magnet member may further include a second yoke connected to the first magnet and the second magnet. The second yoke may be arranged at a position overlapping the attracting portion in the first direction. In this case, the attraction of the attracting portion to the movable iron core is further enhanced.

The attracting portion may have a shape in which the area of the cross-section perpendicular to the second direction decreases as approaching the center of the movable iron core, within a portion overlapping with the movable iron core in the first direction. In this case, the magnetic flux generated by the coil is likely to be directed toward the movable iron core.

The attracting portion may be arranged separately in the second direction. In this case, the magnetic flux generated by the coil is more likely to be directed toward the movable iron core. In addition, for example, the first yoke can be configured by a pair of L-shaped members, and thereby the degree of freedom in designing the first yoke increases.

The movable iron core may extend in a plate shape in a direction perpendicular to the first direction. In this case, the cost of the movable iron core can be reduced.

The movable iron core and the magnet member may face the first yoke in the first direction on the outside of the first yoke. In this case, the inner diameter of the coil can be prevented from increasing as compared to the case where the magnet member is arranged inside the coil.

The coil may have an axis parallel to the first direction. The first yoke may include a pair of side portions extending in a direction perpendicular to the axis of the coil. The movable iron core and the magnet member may be arranged at positions overlapping the pair of side portions in the first direction. In this case, the configuration allows the attracting portion to be disposed on the pair of side portions.

The coil may have an axis that intersects with the first direction. In this case, the size of the electromagnetic relay is unlikely to increase in the first direction.

The coil may generate a magnetic flux toward the attracting portion in the same direction as the direction of the magnetic flux generated by a current flowing through the movable contact piece when energized. In this case, the attraction of the attracting portion to the movable iron core is further enhanced.

The electromagnetic relay may further include a return spring for urging the movable iron core in the separation direction. The return spring may have a substantially C-shaped cross-section, and may have opposite ends positioned apart from the center of the movable iron core. In this case, when the movable iron core moves in the first direction, the return spring can reduce the possibility that the movable iron core tilts.

The movable iron core may include a pair of recesses for supporting the opposite ends of the return spring. In this case, the return spring can be supported by the movable iron core, and the movable iron core is unlikely to rotate.

The first yoke may include a pair of side portions extending in a direction perpendicular to the axis of the coil. The drive device may include a spool around which the coil is wound, and a fixed iron core arranged on an inner periphery of the spool and connected to the pair of side portions. The fixed iron core may include a first plate member that is integral with the pair of side portions, and a second plate member that is overlayed on the first plate member. The first plate member and the second plate member may be insert-molded into the spool.

DETAILED DESCRIPTION

Figure 1:
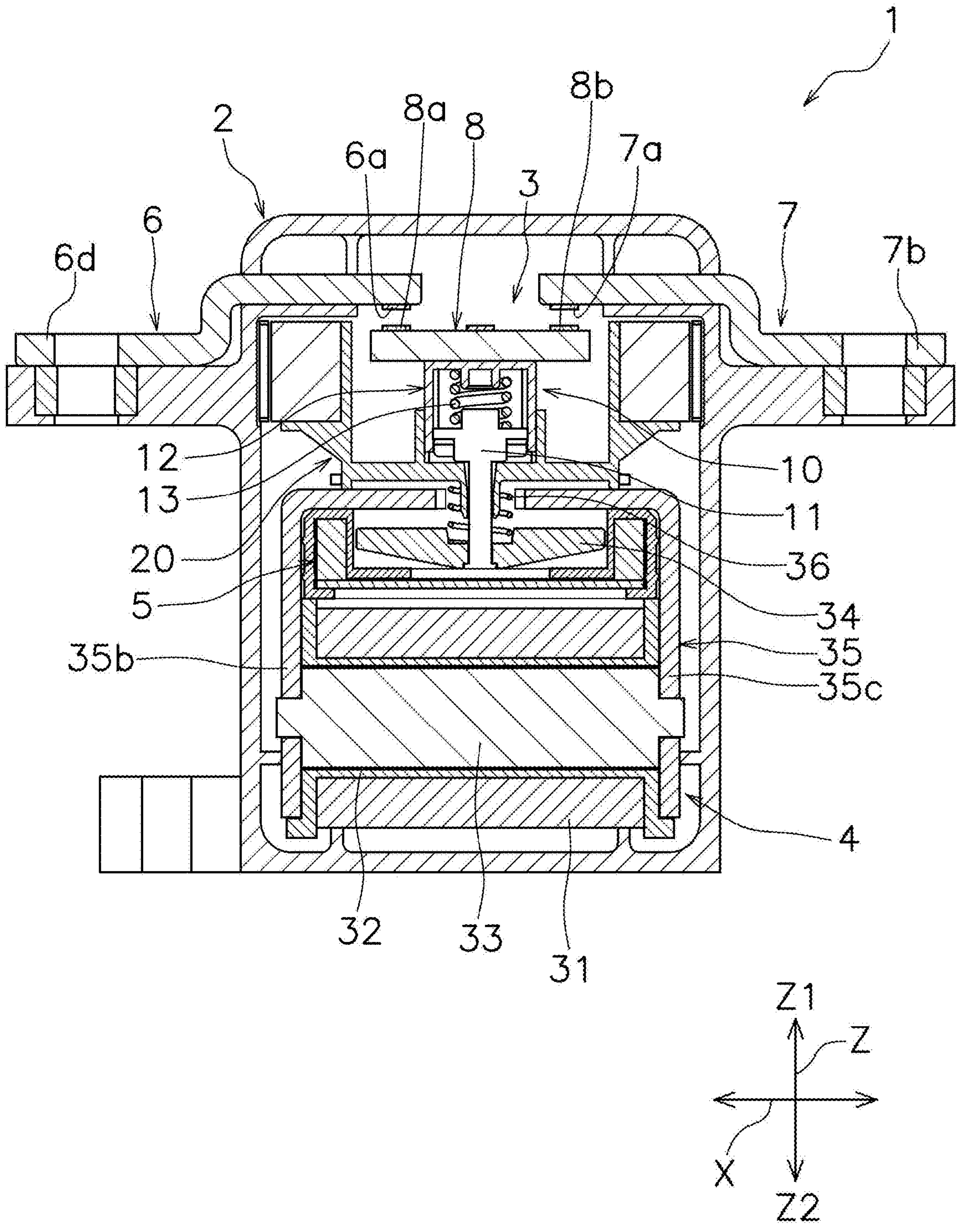
FIG. 1 is a cross-sectional diagram of an electromagnetic relay in accordance with the claimed invention.

Hereinafter, one embodiment of an electromagnetic relay 1 according to one aspect of the claimed invention will be described with reference to the drawings. When referring to the drawings, for easier understanding of the description, the upper side in FIG. 1 will be referred to as "upper", the lower side as "lower", the left side as "left", and the right side as "right". In addition, a direction perpendicular to the paper plane of FIG. 1 will be described as a front-rear direction. These directions are defined for convenience of description, and do not limit the directions in which the electromagnetic relay 1 is arranged. It should be noted that the up-down direction in the present embodiment corresponds to a first direction Z. The left-right direction in the present embodiment corresponds to a second direction X.

As illustrated in FIG. 1, the electromagnetic relay 1 includes a case 2, a contact device 3, a drive device 4, and a magnet member 5. The electromagnetic relay 1 is a plunger-type electromagnetic relay.

The case 2 has a substantially rectangular box shape and is comprised of insulating material such as resin. The contact device 3, the drive device 4, and the magnet member 5 are housed in the case 2.

The contact device 3 includes a first fixed terminal 6, a second fixed terminal 7, a movable contact piece 8, and a movable mechanism 10.

The first fixed terminal 6 and the second fixed terminal 7 are plate terminals, and are comprised of conductive material. The first fixed terminal 6 and the second fixed terminal 7 extend in the left-right direction and have a bent shape. The first fixed terminal 6 and the second fixed terminal 7 extend throughout the case 2 to the exterior of the case 2.

The first fixed terminal 6 includes a first fixed contact *6a* and a first external connection *6b*. The first fixed contact *6a* is arranged on the lower surface of the first fixed terminal 6 inside the case 2. The first external connection *6b* protrudes to the left of the case 2 and is exposed to the outside. The first external connection *6b* is to be connected to an external terminal (not shown) such as a bus bar.

The second fixed terminal 7 is arranged apart from the first fixed terminal 6 in the left-right direction. The second fixed terminal 7 includes a second fixed contact *7a* and a second external connection *7b*. The second fixed terminal 7 is configured to be bilaterally symmetrical in shape to the first fixed terminal 6, and a detailed description thereof will be omitted.

The movable contact piece 8 is a plate terminal that is long in one direction, and is comprised of conductive material. The movable contact piece 8 is placed inside the case 2. The movable contact piece 8 extends in the left-right direction inside the case 2. The longitudinal direction of movable contact piece 8 coincides with the left-right direction. The lateral direction of movable contact piece 8 coincides with the front-rear direction.

The movable contact piece 8 includes a first movable contact *8a* and a second movable contact *8b*. The first movable contact *8a* faces the first fixed contact *6a* in the up-down direction and is configured to contact the first fixed contact *6a*. The second movable contact *8b* faces the second fixed contact *7a* in the up-down direction and is configured to contact the second fixed contact *7a*.

The movable contact piece 8 is movable in a first direction Z (here, the up-down direction). The first direction Z includes a contact direction Z1 and a separation direction Z2. The contact direction Z1 is a direction in which the first movable contact *8a* approaches the first fixed contact *6a* and the second movable contact *8b* approaches the second fixed contact *7a*. The separation direction Z2 is a direction in which the first movable contact *8a* separates from the first fixed contact *6a* and the second movable contact *8b* separates from the second fixed contact *7a*. In the present embodiment, the contact direction Z1 corresponds to the upward direction, and the separation direction Z2 corresponds to the downward direction.

The movable mechanism 10 is guided to move in the up-down direction by an inner member 20 that is disposed above the drive device 4. The inner member 20 has a substantially rectangular box shape that is open upward, and it is partially or entirely comprised of insulating material such as resin. The inner member 20 is fixed to the drive device 4.

The movable mechanism 10 includes a drive shaft 11, a holder 12, and a contact spring 13. The drive shaft 11 is an example of the moving member. The drive shaft 11 is comprised of insulating material such as resin or of metal. The drive shaft 11 extends in the up-down direction. The drive shaft 11 is connected to the movable contact piece 8 via the holder 12.

The holder 12 holds the movable contact piece 8. The contact spring 13 is arranged within the holder 12 between the movable contact piece 8 and the drive shaft 11.

The drive device 4 is arranged below the contact device 3 and the inner member 20. The drive device 4 is configured to move the drive shaft 11 in the up-down direction. The drive device 4 is configured to move the movable contact piece 8 in the up-down direction via the drive shaft 11.

Figure 2:
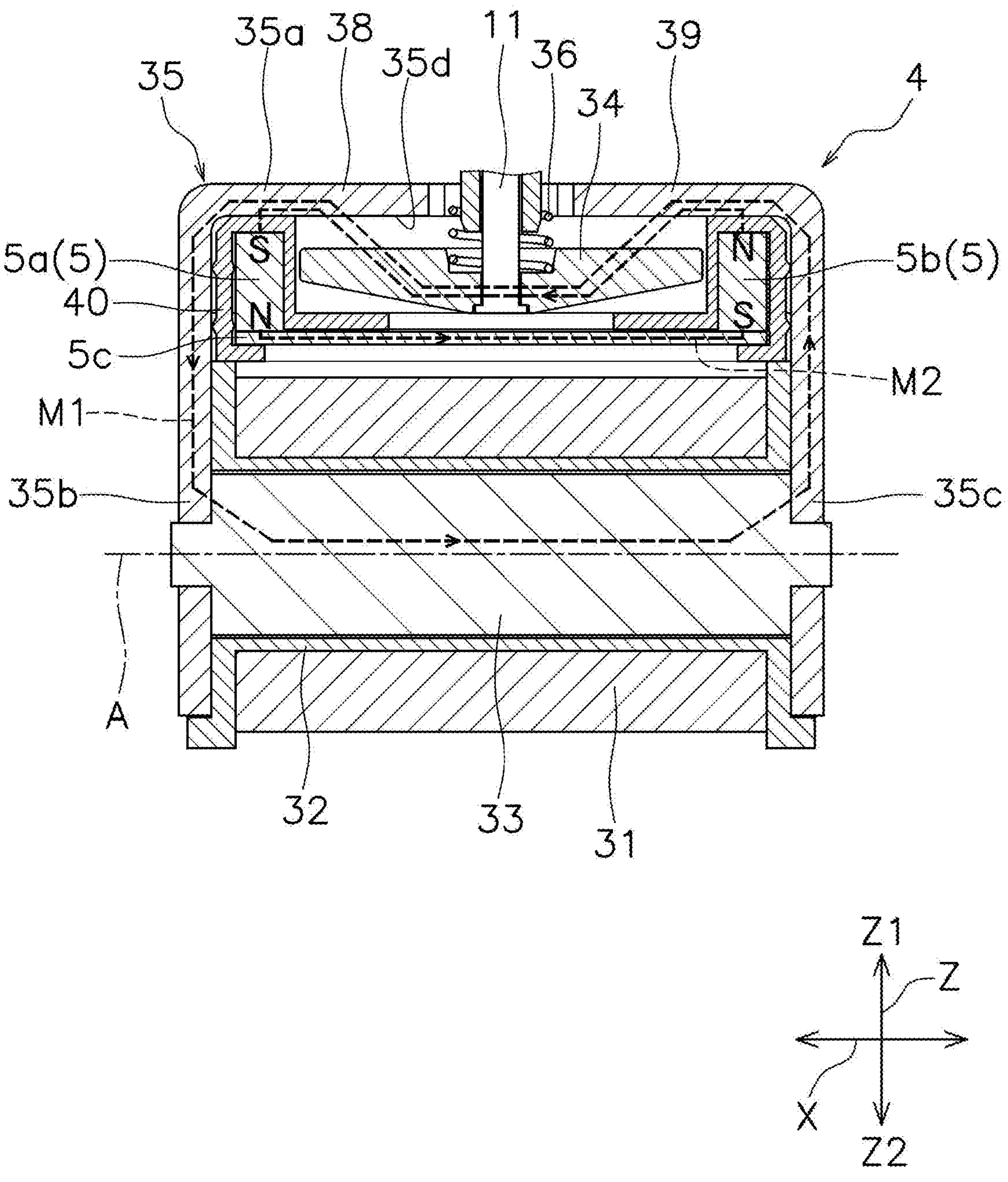
FIG. 2 is a cross-sectional diagram of a drive device.
Figure 3:
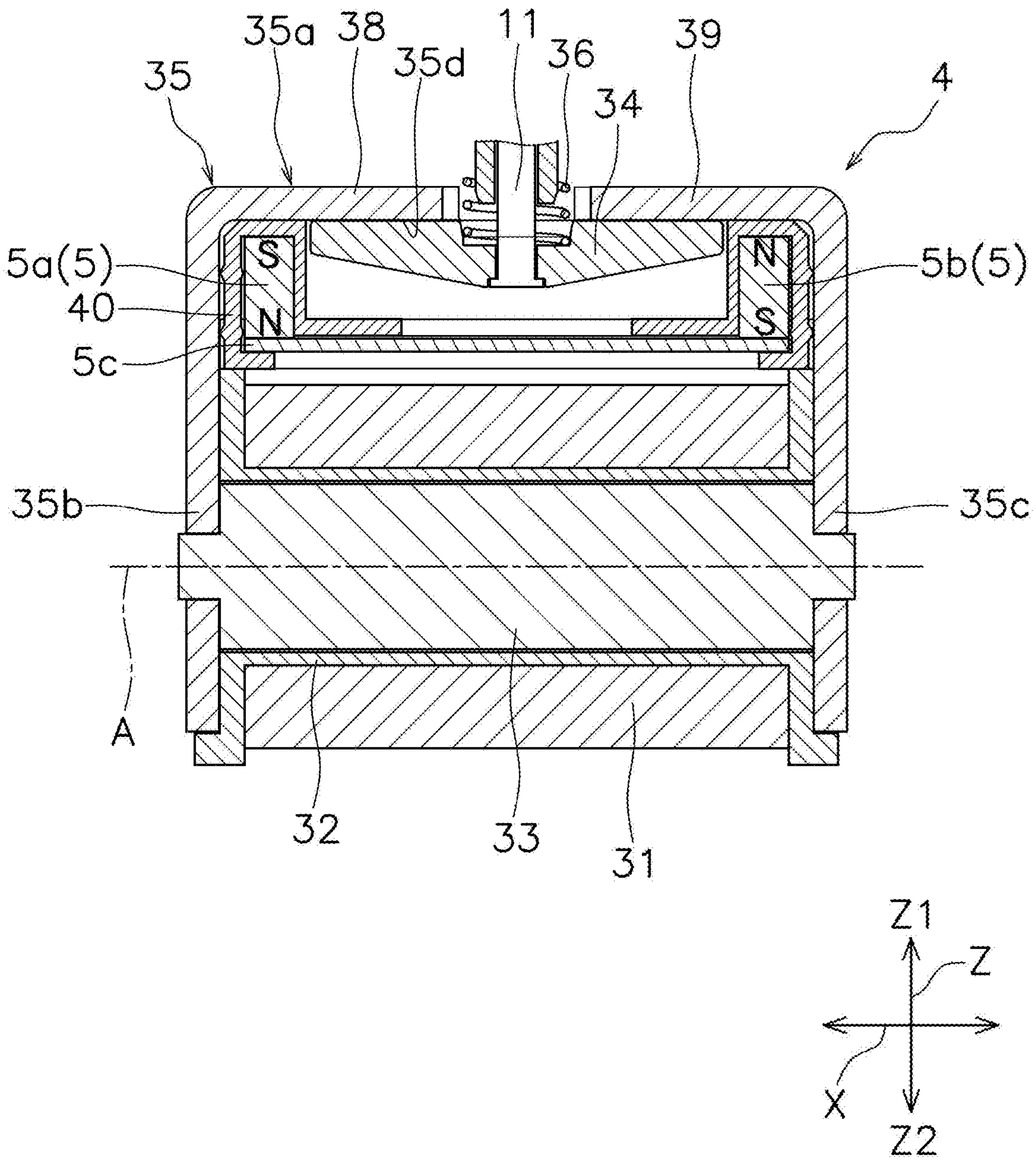
FIG. 3 is a cross-sectional diagram of a drive device.

As shown in FIGS. 2 and 3, the drive device 4 includes a coil 31, a spool 32, a fixed iron core 33, a movable iron core 34, a first yoke 35, and a return spring 36.

The coil 31 generates electromagnetic force. Specifically, when excited by application of a voltage, the coil 31 generates an electromagnetic force that moves the movable iron core 34 in the contact direction Z1. When energized, a magnetic flux M1 generated by the coil 31 passes through the fixed iron core 33, the movable iron core 34, and the first yoke 35. The coil 31 has an axis A that intersects the up-down direction. In the present embodiment, the axis A of the coil 31 extends in the left-right direction.

The spool 32 has a cylindrical shape, and the coil 31 is wound around the outer periphery of the spool 32. The spool 32 extends in the left-right direction.

The fixed iron core 33 is arranged on the inner periphery of the spool 32. The fixed iron core 33 is arranged inside coil 31. The fixed iron core 33 extends in the left-right direction, and it has two ends in the left-right direction that are connected to the first yoke 35.

Figure 4:
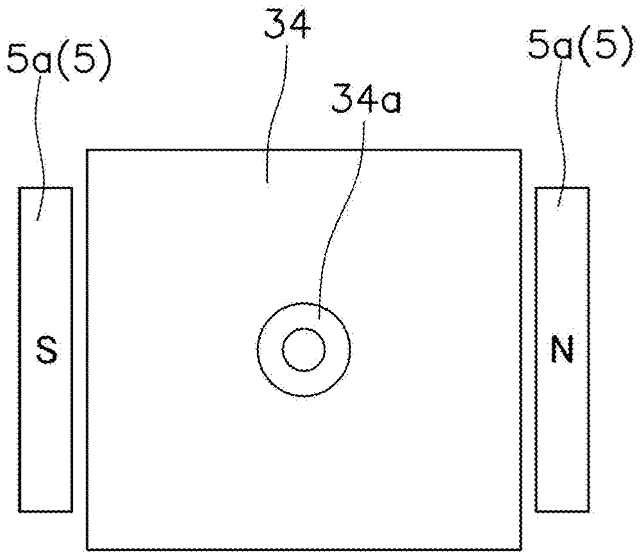
FIG. 4 is a schematic diagram of a movable iron core and a magnet member viewed from above.

The movable iron core 34 extends in a plate shape in a direction perpendicular to the up-down direction. As shown in FIG. 4, the movable iron core 34 has a rectangular shape when viewed from the up-down direction. The movable iron core 34 has a dimension in the up-down direction that is smaller than those in the left-right direction and the front-back direction. The movable iron core 34 is, at the center portion, fixed to the lower end of the drive shaft 11. The movable iron core 34 moves integrally with the drive shaft 11 in the up-down direction.

The movable iron core 34 is arranged radially outside of the coil 31 with respect to the coil 31. The radially outside of the coil 31 is the side positioned away from the axis A of the coil 31 along a straight line perpendicular to the axis A of the coil 31. The movable iron core 34 is arranged on the outer peripheral side of the spool 32. The movable iron core 34 is disposed between the coil 31 and the first yoke 35. The movable iron core 34 is arranged at a position overlapping the coil 31 and the first yoke 35 in the up-down direction. The upper surface of the movable iron core 34 has a recess 34*a* for accommodating the lower end of the return spring 36.

Figure 5:
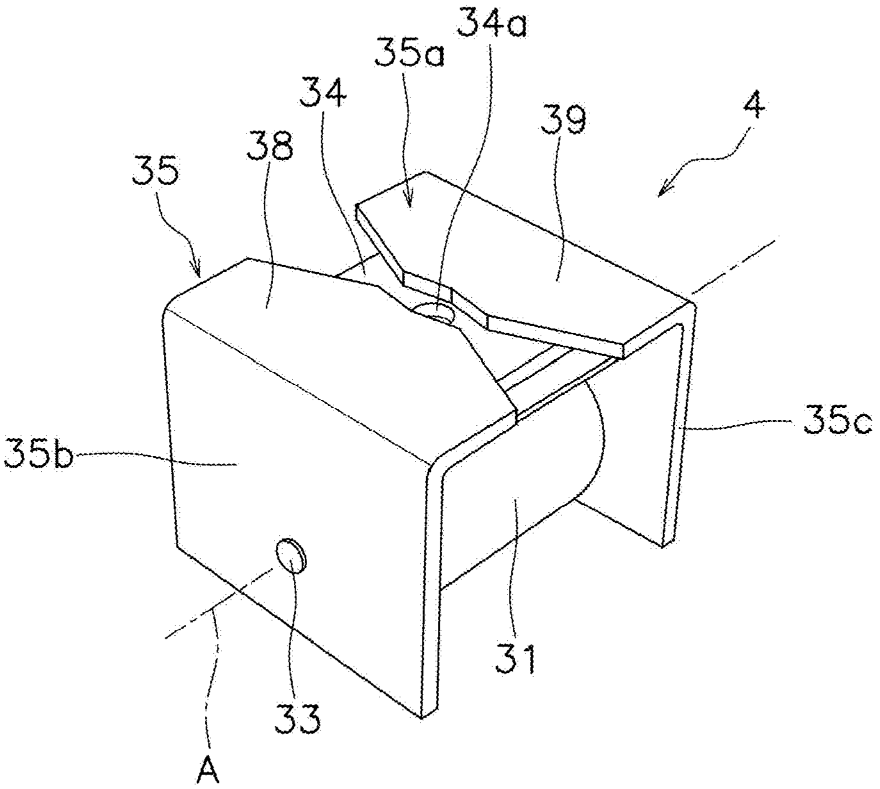
FIG. 5 is a perspective diagram of a drive device.

The first yoke 35 covers the coil 31 from the left and right sides and from above. The first yoke 35 has a substantially U-shape that is open downward when viewed from the front-rear direction. In the present embodiment, as shown in FIG. 5, the first yoke 35 is configured by a pair of L-shaped members. The pair of L-shaped members are arranged apart from each other in the left-right direction.

The first yoke 35 includes a central portion 35*a*, a first side portion 35*b*, a second side portion 35*c*, and an attracting portion 35*d*. The first side portion 35*b* and the second side portion 35*c* are an example of the pair of side portions.

The central portion 35*a* is arranged above the magnet member 5 and the movable iron core 34, and faces the movable iron core 34 in the up-down direction. The central portion 35*a* extends in a direction perpendicular to the up-down direction. The central portion 35*a* has, around the center in the left-right direction, an opening in the up-down direction. The central portion 35*a* is, around the center in the left-right direction, separated in the left-right direction. The drive shaft 11 passes through the center of the central portion 35*a* in the up-down direction. Hereinafter, in the central portion 35*a*, the central portion 35*a* located on the left side with respect to the drive shaft 11 may be referred to as a first portion 38, and the central portion 35*a* located on the right side with respect to the drive shaft 11 may be referred to as a second portion 39. The left end of the central portion 35*a* (the left end of the first portion 38) is connected to the first side portion 35*b*. The right end of the central portion 35*a* (the right end of the second portion 39) is connected to the second side portion 35*c*.

The central portion 35*a* has, in the portion overlapping with the movable iron core 34 in the up-down direction, a shape in which the area of the cross-section taken perpendicular to the left-right direction decreases toward the center of the central portion 35*a* or the center of the movable iron core 34. The central portion 35*a* has, in the portion overlapping with the movable iron core 34 in the up-down direction, a shape in which the area of the cross-section taken perpendicular to the left-right direction decreases toward the drive shaft 11. The central portion 35*a* has a shape in which the dimension in the front-rear direction decreases toward the center of the central portion 35*a* when viewed from the up-down direction.

The first side portion 35*b* and the second side portion 35*c* extend in a direction perpendicular to the left-right direction and have a substantially rectangular shape when viewed from the left-right direction. The first side portion 35*b* extends downward from the left end of the central portion 35*a*. The first side portion 35*b* is arranged on the left side of the coil 31. The first side portion 35*b* is connected to the left end of the fixed iron core 33. The first side portion 35*b* is fixed to the fixed iron core 33 by caulking. The second side portion 35*c* faces the first side portion 35*b* in the left-right direction. The second side portion 35*c* extends downward from the right end of the central portion 35*a*. The second side portion 35*c* is connected to the right end of the fixed iron core 33. The second side portion 35*c* is fixed to the fixed iron core 33 by caulking. The second side portion 35*c* is arranged on the right side of the coil 31.

The attracting portion 35*d* faces the movable iron core 34 in the up-down direction. The attracting portion 35*d* attracts the movable iron core 34 in the contact direction Z1 using the electromagnetic force generated by the coil 31. The attracting portion 35*d* is configured by part of the central portion 35*a*. The attracting portion 35*d* is configured by part of the central portion 35*a* that overlaps the movable iron core 34 in the up-down direction. Accordingly, the attracting portion 35*d* is configured by both the first portion 38 and the second portion 39 of the central portion 35*a*. The attracting portion 35*d* is separated and arranged in the left-right direction.

The attracting portion 35*d* has, in the portion overlapping with the movable iron core 34 in the first direction Z (here, the up-down direction), a shape in which the area of the cross-section taken perpendicular to a second direction decreases toward the center of the movable iron core 34, the second direction (here, the left-right direction) being perpendicular to the first direction Z. In the present embodiment, the attracting portion 35*d* has a shape in which the dimension in the front-rear direction decreases toward the center of the movable iron core 34.

The return spring 36 urges the movable iron core 34 toward the separation direction Z2 (here, downward). The return spring 36 is arranged around the drive shaft 11. The return spring 36 is disposed between the movable iron core 34 and the inner member 20. The return spring 36 is comprised by a coil spring.

The magnet member 5 includes at least one permanent magnet. The magnet member 5 is arranged on the outer side of the coil 31 in the radial direction with respect to the coil 31. The magnet member 5 generates magnetic flux for assisting the attraction of the movable iron core 34 by the attracting portion 35*d*. Specifically, the magnet member 5 generates a magnetic flux M2 in the same direction as the direction of the magnetic flux M1 with respect to the movable iron core 34.

The magnet member 5 includes a first magnet 5*a*, a second magnet 5*b*, and a second yoke 5*c*. The first magnet 5*a* and the second magnet 5*b* are permanent magnets. As the first magnet 5*a* and the second magnet 5*b*, for example, a ferrite magnet, a neodymium magnet, a samarium-cobalt magnet, or the like may be used.

The first magnet 5*a* and the second magnet 5*b* have a rectangular shape and extend in a direction perpendicular to the left-right direction. The first magnet 5*a* and the second magnet 5*b* are arranged at positions overlapping the movable iron core 34 in the left-right direction.

The first magnet 5*a* is arranged on the left side of the movable iron core 34. The first magnet 5*a* is disposed between the movable iron core 34 and the first side portion 35*b*. The first magnet 5*a* is separated from the movable iron core 34 and the first yoke 35. Specifically, the first magnet 5*a* is held by a magnet holder 40 that is disposed between the spool 32 and the central portion 35*a*. The first magnet 5*a* is arranged such that the north pole faces downward and the south pole faces upward.

The second magnet 5*b* faces the first magnet 5*a* in the second direction X (here, the left-right direction). The second magnet 5*b* is arranged on the right side of the movable iron core 34. Accordingly, the movable iron core 34 is disposed between the first magnet 5*a* and the second magnet 5*b*. The second magnet 5*b* is disposed between the movable iron core 34 and the second side portion 35*c*. The second magnet 5*b* is separated from the movable iron core 34 and the first yoke 35. The second magnet Sb is held by the magnet holder 40. The second magnet 5*b* is arranged such that the north pole faces upward and the south pole faces downward.

The second yoke 5*c* is connected to the first magnet 5*a* and the second magnet 5*b*. The second yoke 5*c* is arranged below the first magnet 5*a* and the second magnet 5*b*. The second yoke 5*c* is connected to the North pole of the first magnet 5*a* and the South pole of the second magnet 5*b*. The second yoke 5*c* is disposed between the coil 31 and the movable iron core 34. The second yoke 5*c* is arranged at a position overlapping the attracting portion 35*d* in the up-down direction. The second yoke 5*c* is held by the magnet holder 40.

Next, the operation of electromagnetic relay 1 will be described. FIGS. 1 and 2 show a state in which the coil 31 is not energized. In this state, the first movable contact 8*a* is separated from the first fixed contact 6*a*, and the second movable contact 8*b* is separated from the second fixed contact 7*a*. When the coil 31 is energized, the movable iron core 34 moves upward together with the drive shaft 11 against the urging force of the return spring 36. As the drive shaft 11 moves, the movable contact piece 8 is pressed upward via the contact spring 13 and the holder 12, and the movable contact piece 8 moves upward. As a result, the first movable contact 8*a* contacts the first fixed contact 6*a*, and the second movable contact 8*b* contacts the second fixed contact 7*a*.

As shown in FIG. 2, a magnetic circuit is formed by the fixed iron core 33, the first yoke 35, and the movable iron core 34 when energized. Specifically, the magnetic flux M1 flows, starting from the fixed iron core 33, through the fixed iron core 33, the second side portion 35*c*, the attracting portion 35*d* of the second portion 39 of the central portion 35*a*, the movable iron core 34, the attracting portion 35*d* of the first portion 38 of the central portion 35*a*, and the first side portion 35*b* in this order. The attracting portion 35*d* and the movable iron core 34 are magnetized by the magnetic flux M1. As a result, as shown in FIG. 3, the movable iron core 34 is attracted by the attracting portion 35*d*, and the movable iron core 34 moves in the contact direction Z1.

The magnet member 5 generates the magnetic flux M2 to the movable iron core 34 in the same direction as the direction of the magnetic flux M1. Specifically, the magnetic flux M2 flows, starting from the second magnet 5*b*, through the attracting portion 35*d* of the second portion 39 of the central portion 35*a*, the movable iron core 34, the attracting portion 35*d* of the first portion 38 of the central portion 35*a*, the first magnet 5*a*, and the second yoke 5*c* in this order. As a result, the magnetic flux flowing from the attracting portion 35*d* of the second portion 39 of the central portion 35*a* through the movable iron core 34, and the magnetic flux flowing from the movable iron core 34 through the attracting portion 35*d* of the first portion 38 of the central portion 35*a*, increase. Thus, the attraction of the attracting portion 35*d* to the movable iron core 34 is enhanced.

When the application of a voltage to the coil 31 is stopped, the drive shaft 11 is moved downward together with the movable iron core 34 by the urging force of the return spring 36. The movable contact piece 8 is then moved downward via the contact spring 13 and the holder 12, the movable contact piece 8 is separated from the first fixed contact 6*a*, and the second movable contact 8*b* is separated from the second fixed contact 7*a*.

In the electromagnetic relay 1 of the above configuration, the magnet member 5 for assisting the attraction of the movable iron core 34 by the attracting portion 35*d* of the first yoke 35 is disposed radially outside of the coil 31. With this configuration, as compared to the case where the magnet member 5 is disposed inside of the coil 31, the inner diameter of the coil 31 is unlikely to increase. As a result, any reduction in the efficiency of the magnetomotive force of the coil 31 can be reduced.

Because the movable iron core 34 and the attracting portion 35*d* are arranged radially outside of the coil 31 with respect to the coil 31, the degree of freedom in designing the movable iron core 34 and the attracting portion 35*d* is increased.

The attracting portion 35*d* has, in the portion overlapping with the movable iron core 34 in the up-down direction, a shape in which the area of the cross-section taken perpendicular to the left-right direction decreases toward the center of the central portion of the movable iron core 34. Accordingly, the magnetic flux M1 easily tends to be directed from the attracting portion 35*d* of the second portion 39 toward the movable iron core 34, and also from the movable iron core 34 toward the attracting portion 35*d* of the first portion 38. This configuration is expected to enhance the attraction of the attracting portion 35*d* to the movable iron core 34.

One embodiment of the electromagnetic relay according to one aspect of the claimed invention has been described above. The claimed invention, however, is not limited to the above embodiment, and various changes can be made without departing from the scope of the claimed invention.

The first fixed terminal 6 and the second fixed terminal 7 may be cylindrical terminals.

The magnet member 5 may be placed in contact with the first yoke 35. The magnet member 5 may be configured to be movable integrally with the movable iron core 34. The magnet member 5 may be placed in contact with the movable iron core 34. The second yoke 5*c* may be omitted. Further, one of the first magnet 5*a* and the second magnet 5*b* may be omitted. For example, in the above embodiment, even if the magnet member 5 is configured by only the first magnet 5*a*, the magnetic flux from the North pole toward the South pole of the first magnet 5*a* flows through the movable iron core 34 in the same direction as the direction of the magnetic flux M1, and thereby the attraction of the attracting portion 35*d* to the movable iron core 34 can be expected to be enhanced.

The shape of the movable iron core 34 may be changed. For example, the movable iron core 34 may be circular or polygonal such as a hexagon when viewed from the up-down direction. Preferably, the magnet member 5 has a shape that follows the outer periphery of the movable iron core 34.

Figure 6:
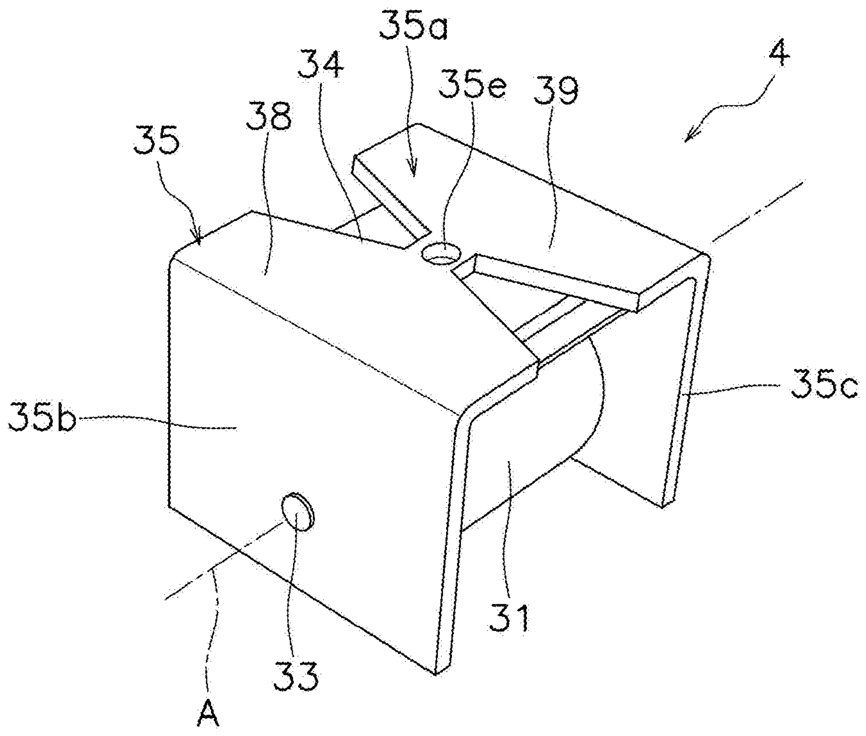
FIG. 6 is a diagram illustrating a modification of a first yoke.
Figure 7:
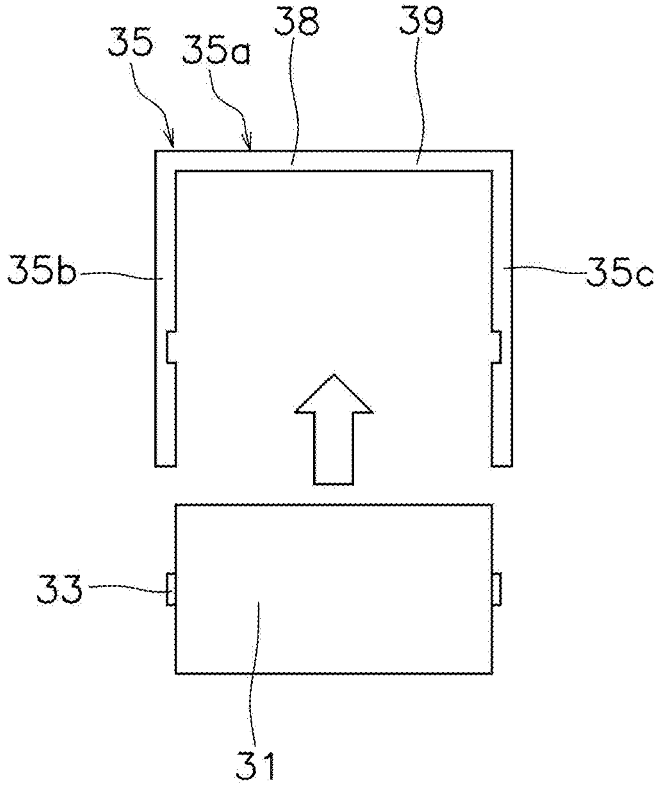
FIG. 7 is a diagram illustrating a modification of a first yoke.
Figure 8:
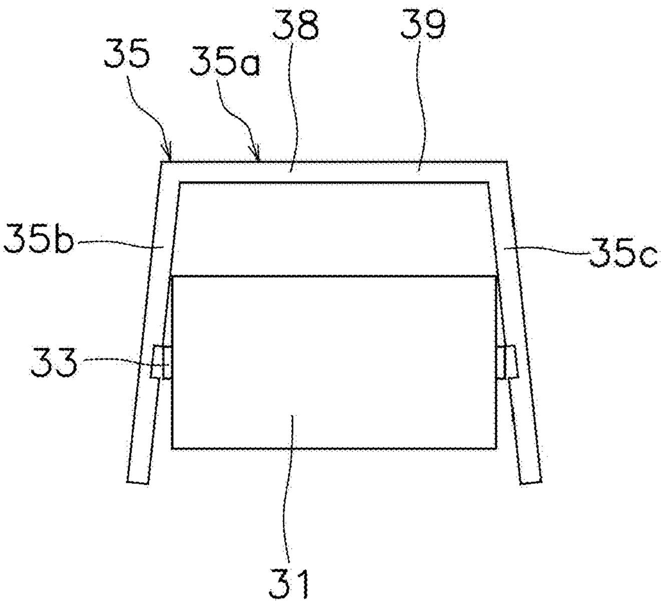
FIG. 8 is a diagram illustrating a modification of a first yoke.

FIGS. 6 to 8 are diagrams each illustrating a modification of the first yoke 35. As illustrated in FIG. 6, the first yoke 35 may be comprised by a single member. That is, the first portion 38 and the second portion 39 of the central portion 35*a* may be connected to each other. In other words, the attracting portion 35*d* does not need to be separated in the left-right direction. The central portion 35*a* includes a through-hole 35*e* through which the drive shaft 11 passes in the up-down direction. In this case, as illustrated in FIGS. 7 and 8, when the coil block including the coil 31, the spool 32, and the fixed iron core 33 is fit into the first yoke 35, the first side portion 35*b* and the second side portion 35*c* are deformed and the coil block is inserted between the first side portion 35*b* and the second side portion 35*c*. As a result, the protrusions of the fixed iron core 33 engage with the recesses formed in each of the first side portion 35*b* and the second side portion 35*c*, and the coil block is fixed to the first yoke 35. Note that the spool 32 is not illustrated in FIGS. 7 and 8.

Figure 9:
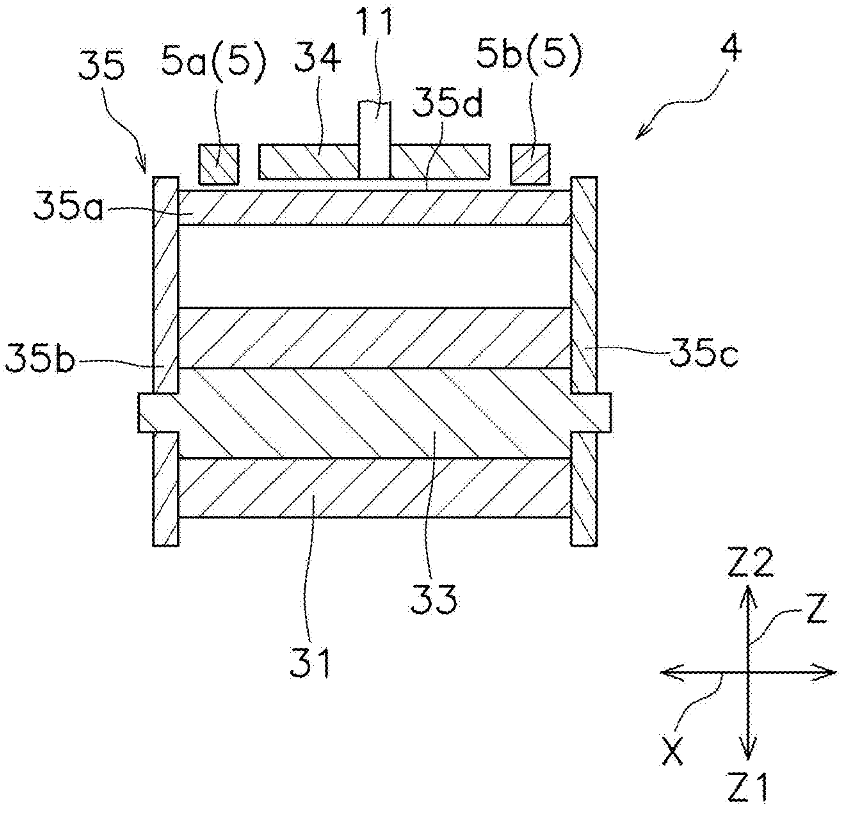
FIG. 9 is a schematic diagram illustrating a first modification of an electromagnetic relay.

In the case where the first portion 38 and second portion 39 of the central portion 35*a* are connected as in the above modification, as illustrated in FIG. 9, the central portion 35*a* and the first side portion 35*b* may be separate members so that the central portion 35*a* and the first side portion 35*b* can be fixed by caulking. Similarly, the central portion 35*a* and the second side portion 35*c* may be separate members to be fixed by caulking.

Further, as illustrated in FIG. 9, the arrangement of the magnet member 5 and the movable iron core 34 may be changed. The magnet member 5 and the movable iron core 34 may be arranged outside the first yoke 35. In the example of FIG. 9, the magnet member 5 and the movable iron core 34 are located outside the central portion 35*a* of the first yoke 35 and face the central portion 35*a*. The contact direction Z1 and the separation direction Z2 are opposite to those in the above embodiment, and the configuration of the contact device 3 is changed accordingly. Note that when the direction of the magnetic flux M1 is the same as in the above embodiment, the first magnet 5*a* is arranged so that the north pole faces upward and the south pole faces downward, and the second magnet 5*b* is arranged so that the north pole faces downward and the south pole faces upward.

Figure 10:
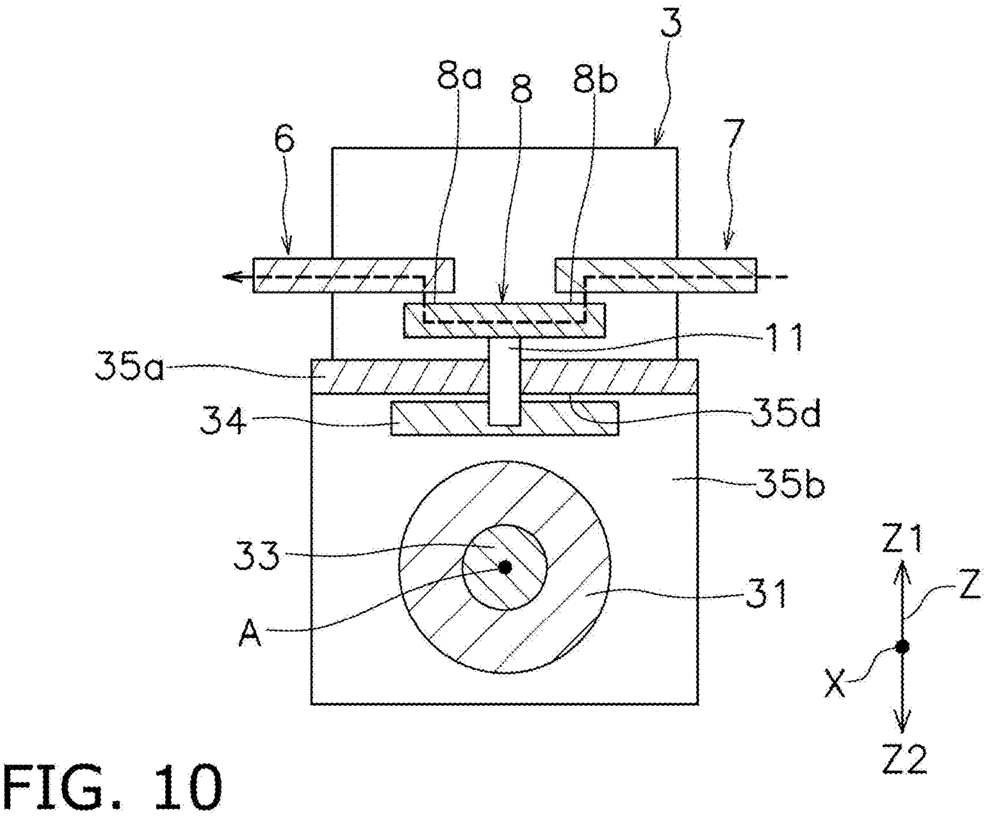
FIG. 10 is a schematic diagram illustrating a second modification of an electromagnetic relay.
Figure 11:
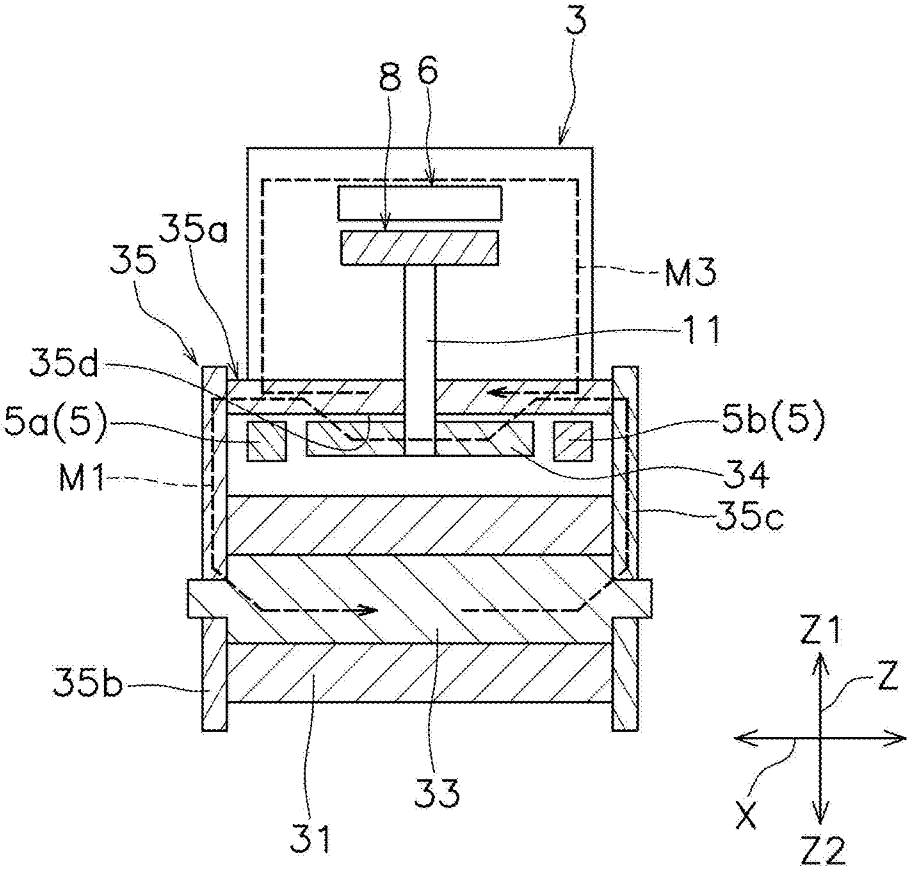
FIG. 11 is a schematic diagram illustrating a second modification of an electromagnetic relay.
Figure 12:
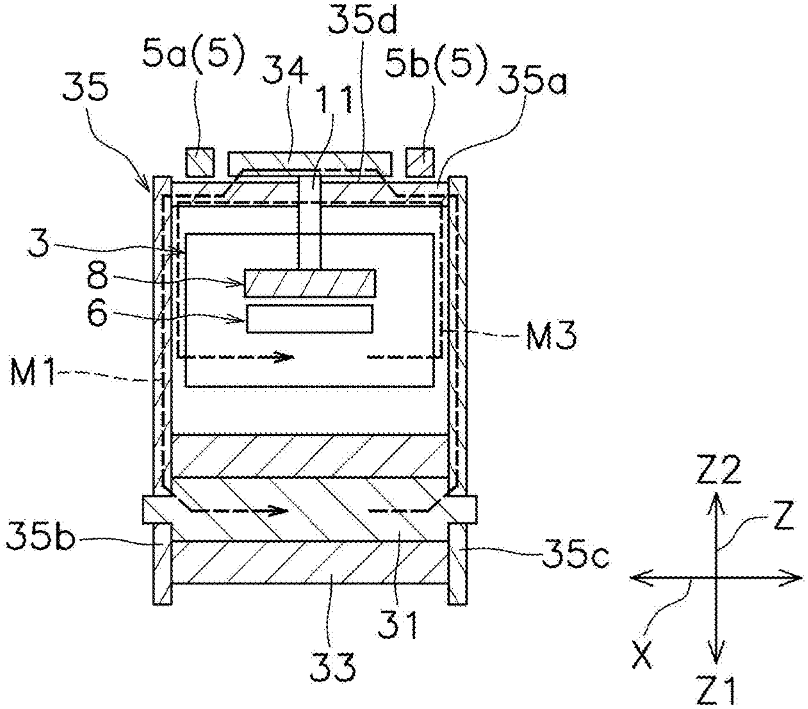
FIG. 12 is a schematic diagram illustrating a third modification of an electromagnetic relay.

As schematically shown in FIGS. 10 to 12, when energized, the magnetic flux generated by a current flowing through the first fixed terminal 6, the second fixed terminal 7, and the movable contact piece 8 may be used to enhance the attraction of the attracting portion 35*d* to the movable iron core 34. FIGS. 10 and 11 show a configuration in which the drive device 4 in the above embodiment is rotated 90 degrees with respect to the contact device 3. That is, the axis A of the coil 31 extends in the front-rear direction. The front-rear direction here coincides with the second direction X. The lateral direction of the movable contact piece 8 is parallel to the axis A of the coil 31. The first fixed terminal 6 and the second fixed terminal 7 extend in the longitudinal direction of the movable contact piece 8 within the case 2.

When energized, the direction of the current flowing through the movable contact piece 8 is set such that the magnetic flux M3 generated by the current flowing through the movable contact piece 8 passes through the attracting portion 35*d* of the first yoke 35 in the same direction as the direction of the magnetic flux M1. In other words, the coil 31 generates the magnetic flux M1 toward the attracting portion 35*d* in the same direction as the direction of the magnetic flux M3. Here, when energized, a current flows in the direction from the second movable contact 8*b* to the first movable contact 8*a*. Further, when energized, the magnetic flux generated by a current flowing through the first fixed terminal 6 and the second fixed terminal 7 passes through the central portion 35*a* and the attracting portion 35*d* in the same direction as the direction of the magnetic flux M1. Note that, in the case where the first fixed terminal 6 and the second fixed terminal 7 are cylindrical terminals, the magnetic flux of the current flowing through the movable contact piece 8 may be used to enhance the attraction of the attracting portion 35*d* to the movable iron core 34.

FIG. 12 shows a configuration in which the magnet member 5 and the movable iron core 34 are arranged outside the first yoke 35, and the contact device 3 is arranged inside the first yoke 35. The contact device 3 is disposed between the first side portion 35*b* and the second side portion 35*c*. The contact device 3 is disposed between the central portion 35*a* and the coil 31. Here, when energized, a current flows in the direction from the first movable contact 8*a* toward the second movable contact 8*b*.

Figure 13:
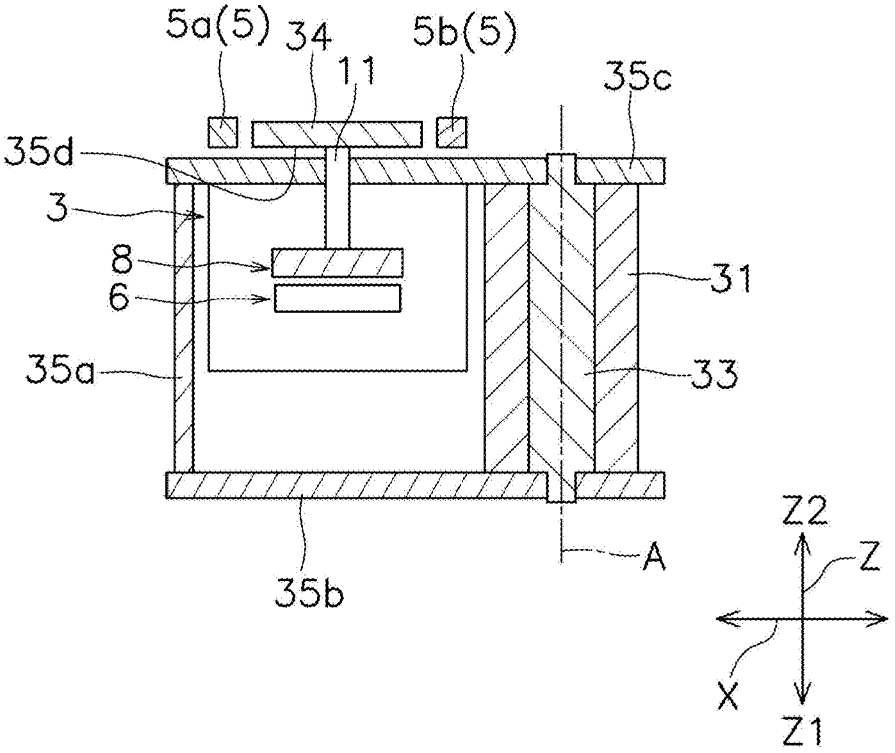
FIG. 13 is a schematic diagram illustrating a fourth modification of an electromagnetic relay.

As shown in FIG. 13, the axis A of the coil 31 may be parallel to the first direction Z (here, the up-down direction). The movable iron core 34 and the magnet member 5 overlap the first side portion 35*b* and the second side portion 35*c* in the first direction Z. The movable iron core 34 and the magnet member 5 face the second side portion 35*c* in the up-down direction on the outside of the second side portion 35*c*. The attracting portion 35*d* is arranged on the second side portion 35*c*. In this case as well, when energized, the magnetic flux M3 generated by the current flowing through the movable contact piece 8 may be set to pass through the attracting portion 35*d* of the first yoke 35 in the same direction as the magnetic flux M1.

Figure 14:
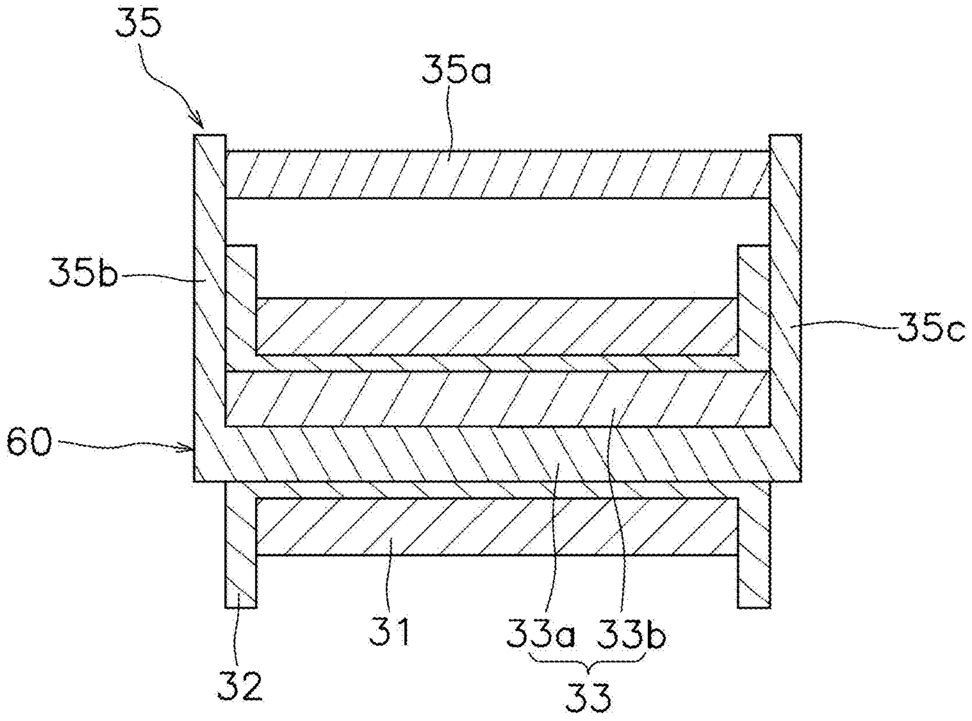
FIG. 14 is a schematic diagram illustrating a modification of a fixed iron core.

As shown in FIG. 14, the fixed iron core 33 may be a laminated iron core including a first plate member 33*a* and a second plate member 33*b*. Further, the first plate member 33*a* may be integral with the first side portion 35*b* and the second side portion 35*c*. The first plate member 33*a* and the second plate member 33*b* may be insert-molded into the spool 32.

Figure 15:
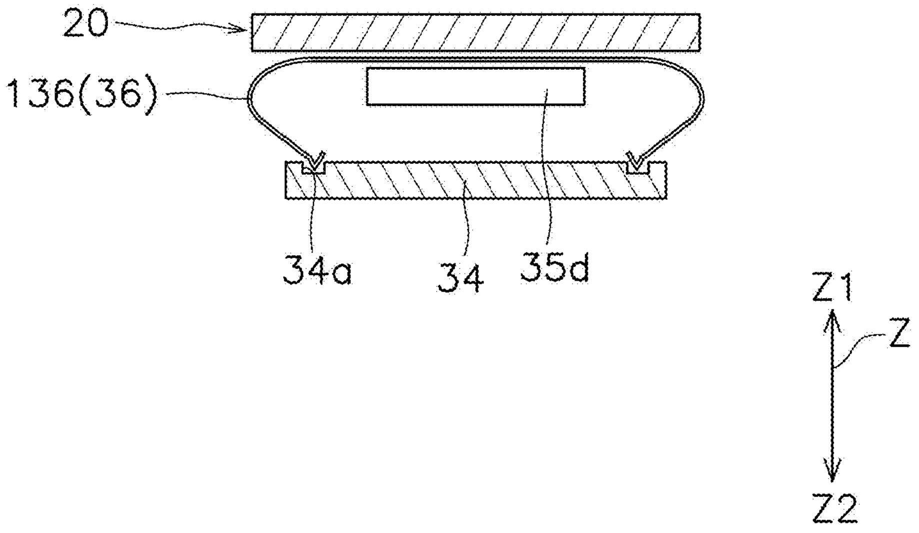
FIG. 15 is a schematic diagram illustrating a modification of a return spring.

As shown in FIG. 15, the return spring 36 may be a leaf spring 136 that has a substantially C-shaped cross-section. Both ends of the leaf spring 136 are located apart from the center of the movable iron core 34. The movable iron core 34 may include a pair of recesses 34*a* for supporting both ends of the leaf spring 136. The pair of recesses 34*a* has a shape that is recessed from the contact direction Z1 toward the separation direction Z2. In FIG. 15, the drive shaft 11 is not illustrated.

REFERENCE NUMERALS

1: Electromagnetic relay, 4: Drive device, 5: Magnet member, 5*a*: First magnet, 5*b*: Second magnet, 5*c*: Second yoke, 6: First fixed terminal, 6*a*: First fixed contact, 7: Second fixed terminal, 7*a*: Second fixed contact, 8: Movable contact piece, 8*a*: First movable contact, 8*b*: Second movable contact, 11: Drive shaft (Example of moving member), 31: Coil, 34: Movable iron core, 35: First yoke, 35*d*: Attracting portion

The invention claimed is:

1. An electromagnetic relay, comprising:

a first fixed terminal including a first fixed contact;

a second fixed terminal including a second fixed contact;

a movable contact piece including a first movable contact facing the first fixed contact in a first direction and a second movable contact facing the second fixed contact iii the first direction, the first direction including a contact direction toward the first fixed contact and a separation direction away from the first fixed contact;

a moving member connected to the movable contact piece, a drive device configured to move the moving member in the first direction, the driving device including a coil configured to generate electromagnetic force when electric current flows therethrough, a movable iron core arranged radially outside of the coil, the movable iron core being fixed to the moving member, and a first yoke including an attracting portion to attract the movable iron core in the contact direction when the electromagnetic force is generated, the first yoke facing the movable iron core in the first direction, and a magnet member including at least one permanent magnet, the magnet member being arranged radially outside of the coil with respect to the coil, the magnet member being configured and arranged to assist attraction of the movable iron core by the attracting portion.

2. The electromagnetic relay according to claim 1, wherein the magnet member includes a first magnet and a second magnet facing the first magnet in a second direction orthogonal to the first direction, the movable iron core is disposed between the first magnet and the second magnet, and the first magnet and the second magnet generate magnetic flux to the movable iron core in the same direction as magnetic flux generated by the coil.

3. The electromagnetic relay according to claim 2, wherein the magnet member further includes a second yoke connected to the first magnet and the second magnet, and the second yoke is arranged at a position overlapping the attracting portion as viewed in the first direction.

4. The electromagnetic relay according to claim 2, wherein the attracting portion has a shape in which cross-sectional area thereof, taken perpendicular to the second direction, decreases toward a center of the movable iron core in a portion overlapping with the movable iron core as viewed in the first direction.

5. The electromagnetic relay according to claim 2, wherein the attracting portion is arranged separately in the second direction.

6. The electromagnetic relay according to claim 1, wherein the movable iron core extends in a plate shape in a direction perpendicular to the first direction.

7. The electromagnetic relay according to claim 1, wherein the movable iron core and the magnet member face the first yoke in the first direction on the outside of the first yoke.

8. The electromagnetic relay according to claim 1, wherein the coil has an axis parallel to the first direction, the first yoke includes a pair of side portions extending in a direction perpendicular to the axis of the coil, and the movable iron core and the magnet member are arranged at positions overlapping the pair of side portions as viewed in the first direction.

9. The electromagnetic relay according to claim 1, wherein the coil has an axis intersecting with the first direction.

10. The electromagnetic relay according to claim 1, wherein the coil generates magnetic flux to the attracting portion in the same direction as the direction of magnetic flux generated by a current flowing through the movable contact piece when energized.

11. The electromagnetic relay according to claim 1, further comprising a return spring to urge the movable iron core in the separation direction, wherein the return spring has a substantially C-shaped cross-section, the return spring having opposite ends positioned apart from a center of the movable iron core.

12. The electromagnetic relay according to claim 11, wherein the movable iron core includes a pair of recesses to support the opposite ends of the return spring.

13. The electromagnetic relay according to claim 1, wherein the first yoke includes a pair of side portions extending in a direction perpendicular to an axis of the coil, the drive device includes a spool around which the coil is wound and a fixed iron core arranged on an inner periphery of the spool, the fixed iron core being connected to the pair of side portions, the fixed iron core includes a first plate member, the first plate member being integral with the pair of side portions, and a second plate member overlayed on the first plate member, and the first plate member and the second plate member have been insert-molded into the spool.

* * * * *